Aug. 20, 1946.   I. W. WAMPLER ET AL   2,406,180
TRAPPER'S STAKE
Filed Oct. 9, 1944
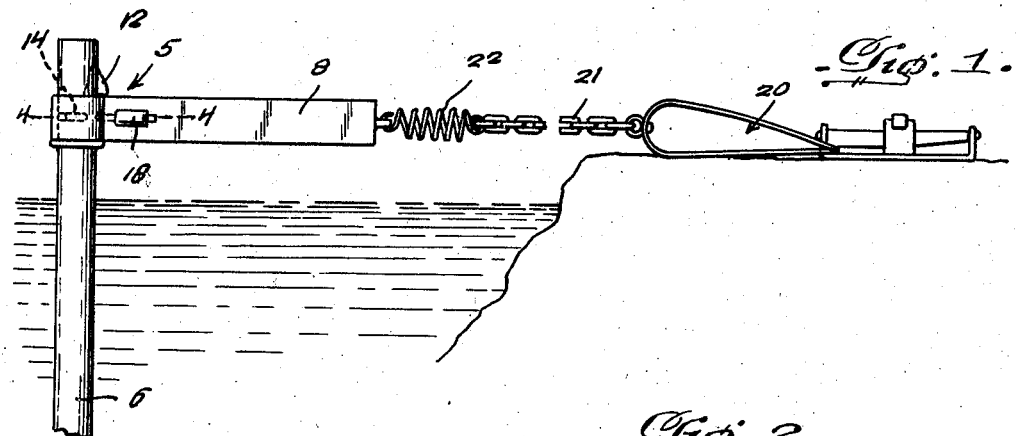
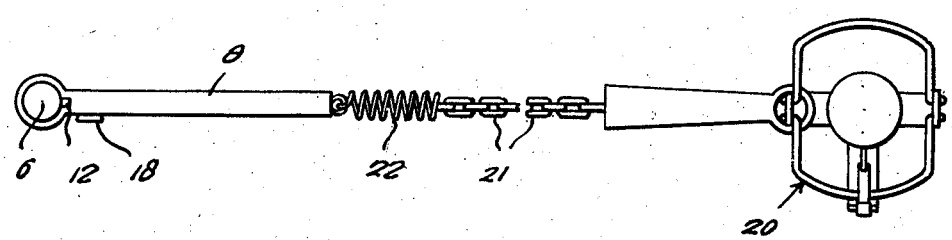
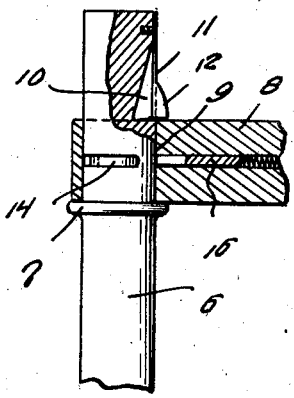
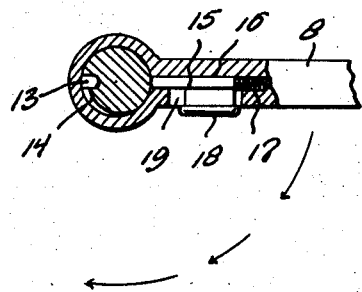
Inventors
Ivan W. Wampler,
Quinton P. Morgan,
Attorneys Patented Aug. 20, 1946

2,406,180

UNITED STATES PATENT OFFICE 2,406,180

TRAPPER'S STAKE

Ivan W. Wampler, Cambridge City, Ind., and Quinton P. Morgan, Arnoldsburg, W. Va.

Application October 9, 1944, Serial No. 557,826

2 Claims. (Cl. 43—96)

This invention relates to new and useful improvements in trapping and more particularly to a stake for anchoring traps to prevent trapped animals from escaping.

The principal object of the present invention is to provide a stake especially for use in trapping water animals wherein the stake is constructed so that when an animal is trapped and starts to swim away, the stake will operate to hold the trap and animal off shore to the end that the animal will drown and not have an opportunity to gnaw himself loose.

Other objects and advantages of the invention will become apparent to the reader of the following description.

In the drawing—

Figure 1 is a side elevational view of the stake and an attached trap.

Figure 2 is a top plan view of the structure shown in Figure 1.

Figure 3 is a fragmentary detailed sectional view showing the upper portion of the stake.

Figure 4 is a horizontal sectional view taken substantially on the line 4—4 of Figure 1.

Referring to the drawing wherein like numerals designate like parts, it can be seen that numeral 5 generally refers to the improved stake. This stake consists of an upright or post 6, preferably sharpened at its lower end so that it can be driven into the bottom of a creek, swamp or other water course.

The upper portion of the post 6 has a circumferential shoulder 7.

Numeral 8 denotes a laterally disposed arm, this arm having a transverse opening 9 in one end for receiving the upper portion of the post 6, to the end that the arm 8 can rest upon the shoulder 7 and be capable of rotating on the post 6.

The portion of the post 6 just above the arm 8 is notched inwardly as at 10 and over this notch 10 is a spring arm 11 having a beveled head 12. It can be seen that the arm 8 can be pushed downwardly over the upper end of the post 6, forcing the head 12 and spring 11 into the notch 10 and subsequently coming to rest upon the shoulder 7. At this position, the spring 11 returns to the position shown in Figure 3 so as to prevent displacement of the arm 8.

At the off-shore side of the post 6 just above the shoulder 7 a recess 13 is provided in the post 6 and a shallow circumferentially extending groove 14 in the post 6 may lead to this recess 13, acting as a guide for receiving a spring-pressed pin 15 slidable in a longitudinal opening 16 in the arm 8, the pin being forced against the post 6 by a spring 17 and having a knob 18 projecting laterally therefrom and operating in a slot 19 of the arm 8.

Numeral 20 denotes a conventional trap connected by a chain 21 to a spring 22, the spring, in turn, being secured to the outer end of the arm 8.

It can now be seen, that when the post 6 has been driven in place with the recess 13 facing off-shore, in the event an animal is caught by the trap 20, his first move is to escape by swimming away and there is a natural tendency when he finds that the post 6 is preventing his escape to circle this element, and in so doing the pin 15 will eventually find its way in the recess 13, thus holding the arm 8 pointed off-shore so that the free end of the arm 8 is projected outwardly from the post 6, whereby the overall length of the flexible connections 22 and 21 together with the trap proper 20 from the outer end of the arm 8 is not sufficient to permit the trapped animal returning to the shore. Thus the animal will be prevented from gnawing himself loose and will ultimately drown.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A trapper's stake comprising a post, a rotatable arm on the post, trap attaching means at the outer end of the arm, said post being provided with an off-shore located recess, said arm being provided with a spring-pressed latch member for entering the recess when the arm is moved to an off-shore position.

2. A trapper's stake comprising a post, a rotatable arm on the post, trap attaching means at the outer end of the arm, said post being provided with an off-shore located recess, said arm being provided with a spring-pressed latch member for entering the recess when the arm is moved to an off-shore position, said post being formed with a guide groove for guiding the latch member to the recess.

IVAN W. WAMPLER.
QUINTON P. MORGAN.